US008117375B2

(12) United States Patent
Sarin et al.

(10) Patent No.: US 8,117,375 B2
(45) Date of Patent: Feb. 14, 2012

(54) MEMORY DEVICE PROGRAM WINDOW ADJUSTMENT

(75) Inventors: Vishal Sarin, Cupertino, CA (US); Frankie F. Roohparvar, Monte Sereno, CA (US); Jonathan Pabustan, San Lorenzo, CA (US); Jung-Sheng Hoei, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 926 days.

(21) Appl. No.: 11/873,894

(22) Filed: Oct. 17, 2007

(65) Prior Publication Data

US 2009/0106482 A1    Apr. 23, 2009

(51) Int. Cl.
*G06F 12/00* (2006.01)
(52) U.S. Cl. .................. 711/103; 711/154; 365/185.12; 365/185.29
(58) Field of Classification Search .................. 711/103, 711/154; 365/185.12, 185.29
See application file for complete search history.

(56) References Cited

U.S. PATENT DOCUMENTS

| 6,163,484 | A | * | 12/2000 | Uekubo ..................... 365/185.2 |
| 7,218,552 | B1 | | 5/2007 | Wan et al. |
| 7,230,854 | B2 | | 6/2007 | Wan et al. |
| 7,339,834 | B2 | | 3/2008 | Lutze |
| 7,495,966 | B2 | | 2/2009 | Aritome |
| 7,532,520 | B2 | * | 5/2009 | Yanagidaira et al. .... 365/185.29 |
| 2006/0221708 | A1 | | 10/2006 | Higashitani |
| 2007/0025157 | A1 | * | 2/2007 | Wan et al. ................ 365/185.22 |
| 2007/0277060 | A1 | * | 11/2007 | Cornwell et al. ............... 714/54 |
| 2008/0123419 | A1 | * | 5/2008 | Brandman et al. ....... 365/185.09 |

* cited by examiner

*Primary Examiner* — Matthew Bradley
(74) *Attorney, Agent, or Firm* — Leffert Jay & Polglaze, P.A.

(57) ABSTRACT

In one or more embodiments, a memory device is disclosed as having an adjustable programming window having a plurality of programmable levels. The programming window is moved to compensate for changes in reliable program and erase thresholds achievable as the memory device experiences factors such as erase/program cycles that change the program window. The initial programming window is determined prior to an initial erase/program cycle. The programming levels are then moved as the programming window changes, such that the plurality of programmable levels still remain within the program window and are tracked with the program window changes.

16 Claims, 5 Drawing Sheets

| Threshold Voltage Levels (volts) | Fixed Bit Pattern (Reference) | Converted Data Bit Pattern (Pre-Cycling) | Converted Data Bit Pattern (Post-Cycling) |
|---|---|---|---|
| 4.00 | 11111 | | |
| 3.75 | 11110 | | |
| 3.50 | 11101 | | |
| 3.25 | 11100 | | 1111 |
| 3.00 | 11011 | | 1110 |
| 2.75 | 11010 | | 1101 |
| 2.50 | 11001 | | 1100 |
| 2.25 | 11000 | 1111 | 1011 |
| 2.00 | 10111 | 1110 | 1010 |
| 1.75 | 10110 | 1101 | 1001 |
| 1.50 | 10101 | 1100 | 1000 |
| 1.25 | 10100 | 1011 | 0111 |
| 1.00 | 10011 | 1010 | 0110 |
| 0.75 | 10010 | 1001 | 0101 |
| 0.50 | 10001 | 1000 | 0100 |
| 0.25 | 10000 | 0111 | |
| 0.00 | 01111 | 0110 | 0011 |
| -0.25 | 01110 | 0101 | |
| -0.50 | 01101 | 0100 | 0010 |
| -0.75 | 01100 | | |
| -1.00 | 01011 | 0011 | 0001 |
| -1.25 | 01010 | | |
| -1.50 | 01001 | 0010 | 0000 |
| -1.75 | 01000 | | |
| -2.00 | 00111 | 0001 | |
| -2.25 | 00110 | | |
| -2.50 | 00101 | 0000 | |
| -2.75 | 00100 | | |
| -3.00 | 00011 | | |
| -3.25 | 00010 | | |
| -3.50 | 00001 | | |
| -3.75 | 00000 | | |

FIG. 4

MEMORY DEVICE PROGRAM WINDOW ADJUSTMENT

TECHNICAL FIELD OF THE INVENTION

The present disclosure relates generally to semiconductor memory and more particularly to non-volatile memory devices.

BACKGROUND OF THE INVENTION

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and non-volatile/flash memory.

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Each cell in a non-volatile memory device can be programmed as a single bit per cell (i.e., single level cell—SLC) or multiple bits per cell (i.e., multilevel cell—MLC). Each cell's threshold voltage ($V_{th}$) determines the data that is stored in the cell. For example, in an SLC, a $V_{th}$ of 0.5V might indicate a programmed cell while a $V_{th}$ of −0.5V might indicate an erased cell. The MLC has multiple positive $V_{th}$ distributions that each indicates a different state whereas a negative distribution typically indicates an erased state. MLC take advantage of the analog nature of a traditional flash cell by assigning a bit pattern to a specific voltage range stored on the cell. The distributions are part of a larger programming window (i.e., the voltage range in which a memory device is programmable) and are separated by a voltage space or margin that is relatively small due to the limitations of fitting, for example, four states into a low voltage memory device.

As flash memory cells go through multiple erase/program cycles, they lose their ability to be erased to a specific negative voltage. This is a result of electron traps in the tunnel oxide that separates the charge storage layer (e.g., floating gate) from the substrate. This is especially undesirable in MLC technology where more states are required to be stored within the programming window. A smaller programming window after cycling can limit the quantity of MLC program states available in the memory device.

FIG. 1 illustrates a graph showing the programming threshold voltage changes for a typical non-volatile memory device. This figure shows the threshold voltages of the non-volatile memory cells along the y-axis and the quantity of erase/program cycles along the x-axis.

Initially, a memory cell might have a maximum erased state of −3.0V and a maximum programmed state of 3.0V as shown closer to the y-axis where the quantity of erase/program cycles is low. As the cycles approach 10 k cycles, it can be seen that the maximum erase state threshold voltage has increased to 0V while the maximum programmed state threshold voltage has increased to 5.0V. Therefore, the most reliable program window in this graph is fixed as being between 0V and 3V. This is the fixed program window that is used for sense operations for a non-volatile memory device.

For the reasons stated above, and for other reasons stated below which will become apparent to those skilled in the art upon reading and understanding the present specification, there is a need in the art for a way to adjust for the effects of erase/program cycling on a program window in a non-volatile memory device.

BRIEF DESCRIPTION OF THE DRAWINGS

FIG. 4 shows one embodiment of a level conversion table in accordance with the methods of FIGS. 1 and 2.

DETAILED DESCRIPTION

Figure 1:
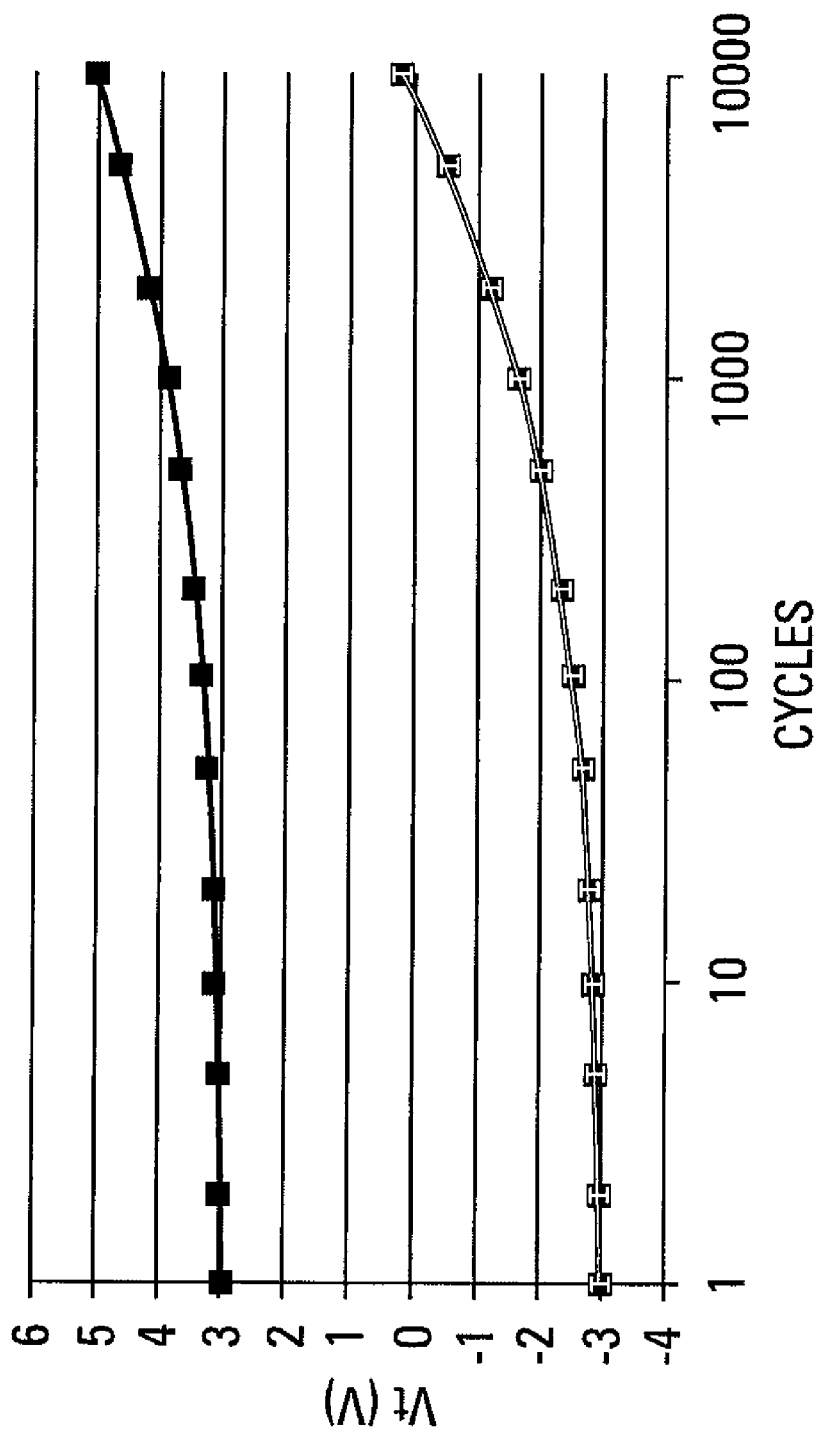
FIG. 1 shows a graph of memory cell threshold voltages ($V_t$) versus quantity of erase/program cycles.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 2:
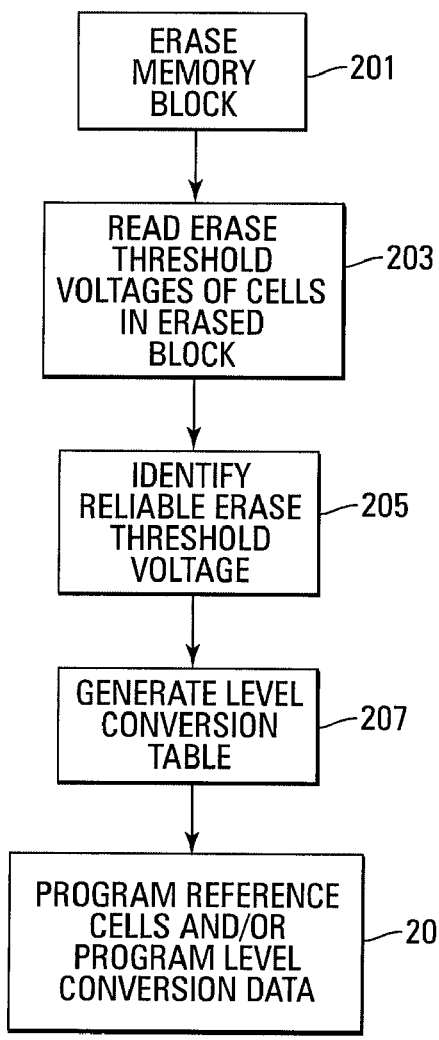
FIG. 2 shows a flowchart of one embodiment of a method for program window adjustment while programming.

FIG. 2 illustrates a flowchart of one embodiment of a method for program window adjustment while programming. A block erase operation is performed 201 on the memory block to be programmed. The erase operation is comprised of making the word line coupled to each row of memory cells more negative than the substrate. For example, biasing each word line with an erase pulse comprising a large negative voltage (e.g., −20V) could be used to move the threshold voltages of the memory cells in the block to a negative level. After each erase pulse, an erase verify operation is performed to determine if the memory cells are adequately erased.

The erase threshold voltages of the erased memory block are then read 203 with a sensing operation. This provides the memory controller with the new erase threshold voltages for the memory block. In one embodiment, the maximum erase threshold voltage for each memory cell is identified as a reliable erase threshold voltage for the memory block 205. This threshold is used to generate a level conversion table 207 as illustrated in FIG. 4 and discussed subsequently.

The maximum reliable program threshold is identified as the minimum programming threshold for the memory device. In other words, the maximum programming threshold at a given point in the life of a memory device, say 4V, might not be a reliable threshold voltage for programming since that high of a voltage might not be programmable to an accurate enough level over the life of the device. Thus, a reliable threshold voltage that can be accurately programmed over the life of the device is identified as the maximum programming threshold.

The updated level conversion table is used to program reference threshold voltage levels into reference cells that are associated with the erased memory block and/or level conversion data is programmed into a memory location 209. If the memory device operates in the digital domain, each reference cell is programmed in accordance with the reference fixed bit pattern that is associated with the updated converted data bit pattern representative of each programmable level, as illustrated in the fourth column of FIG. 4.

In one embodiment, only one reference cell is used per programming level. Alternate embodiments can use other quantities of reference cells. For example, one embodiment might use multiple reference cells per programming level and take the average of the voltages programmed into the cells for sensing purposes, after removing the highest and lowest threshold reference cell from the averaging process.

In another embodiment, conversion information of the updated level conversion table for the erase block is programmed in memory cells. The memory cells with the conversion information can be in the same block or another predetermined location. The conversion information is read from this location with every read of the memory block and the conversion table is used to retrieve actual data bits from the read data bits.

One embodiment of a level conversion table is illustrated in FIG. 4. The first column 401 is comprised of the threshold voltage levels that constitute the range of threshold voltages for the particular memory device. This table starts at a maximum erased level of −3.75V and goes up to a maximum programmed level of 4.00V in increments of 0.25V.

The second column 402 lists a reference state, each being assigned a distinct 5-bit fixed bit pattern, for each of the different threshold voltage levels for the memory device. The most negative threshold voltage is assigned a bit pattern of "00000" and the most positive threshold voltage in the threshold voltage range is "11111". Each bit change represents the 0.25V threshold voltage increment.

The reference fixed bit patterns are generated by the memory array controller and are used in an embodiment that operates in the digital domain. In other words, when a read operation is performed on the memory array, the array outputs a signal corresponding to one of the five-bit reference fixed bit patterns for each cell that is read, instead of a threshold voltage. In an alternate embodiment that operates in the analog domain, the actual threshold voltage of each memory cell being read is output instead of the digital bit pattern.

The third column 403 of the table of FIG. 4 lists the converted data bit patterns that are accurate prior to any erase/program cycling. These four-bit, pre-cycle bit patterns are each representative of a particular reference digital fixed bit pattern of the memory device and each corresponds to a distinct one of the five-bit "reference" patterns. For example, the pre-cycle converted data bit pattern corresponding to "00101" is "0000". This is also the pre-cycle converted bit pattern that is representative of the erased level of the memory cell having a threshold voltage level of −2.50V. The pre-cycle converted data bit pattern corresponding to "11000" is "1111" and represents a threshold voltage of 2.25V.

In the embodiment of FIG. 4, the programmed state represented by "1111" corresponds to the maximum programmed threshold voltage level for the memory cells of the memory block and represents the top of the program window. The bit pattern "0000" corresponds to the erased level of the memory block and represents the bottom of the program window.

The fourth column 404 of the table of FIG. 4 lists the converted data bit patterns that might occur in a post-cycling scenario. It can be seen that the bottom of the program window (i.e., "0000") has shifted up to correspond to the fixed bit pattern "01001" that is representative of the identified reliable threshold voltage level (e.g., −1.50V). The top of the program window (i.e., "1111") has shifted up to correspond to the fixed bit pattern "11100" that is representative of a threshold voltage level of 3.25V.

The program level conversion table of FIG. 4 could be generated by the memory controller and stored in memory for future use during memory read operations. The table, in one embodiment, is updated at every erase operation. Alternate embodiments can update the table at different intervals. The constant updates allow the memory controller to track the changes in the memory cells as they are cycled and to adjust the program window accordingly.

Figure 3:
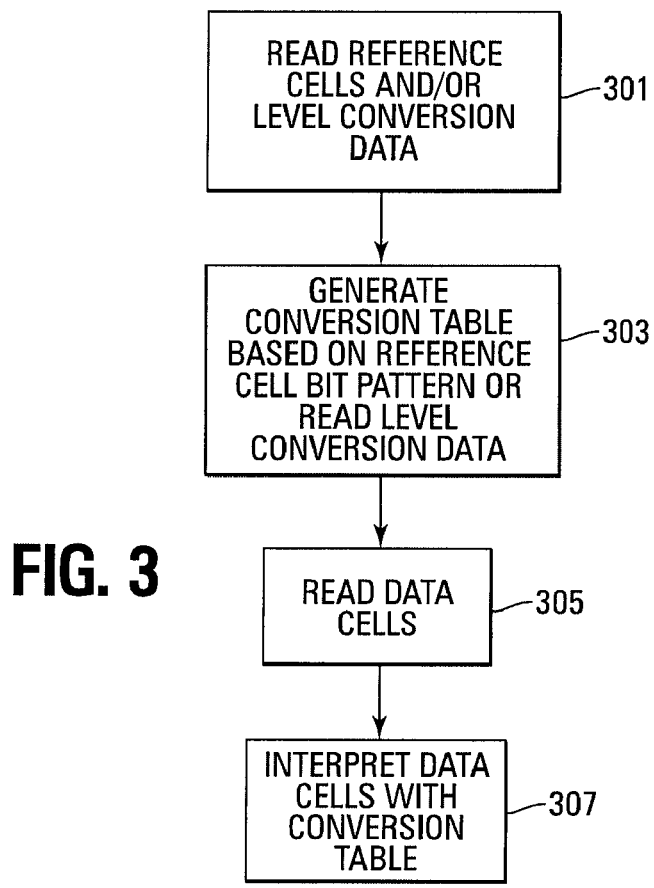
FIG. 3 shows a flowchart of one embodiment of a method for data retrieval at adjusted program levels.

FIG. 3 illustrates a flowchart of one embodiment of a method for data retrieval. This method uses the adjusted program levels from the column of converted data bit pattern 404 of FIG. 4.

The memory block reference cells that were programmed with the adjusted program levels are read 301. These reference cell bit patterns are used to generate a conversion table 303 that is used during the reading of the data cells. The conversion table contains the differences between the read reference cell bit pattern and the expected reference cell bit pattern. The expected reference cell bit pattern is the bit pattern that was initially assigned to each threshold voltage level of the memory cell prior to any erase/program cycles.

For example, an initial converted data bit pattern (Pre-Cycling) of "0000", according to FIG. 4, is assigned to −2.50V and Fixed Bit Pattern of "00101" (i.e., expected reference cell bit pattern). After cycling, the "0000" state is now assigned to −1.50V and a Fixed Bit Pattern of "01001" (i.e., read reference cell bit pattern). This provides a 1.0V reference cell bit pattern difference that is stored in the conversion table.

When the data cells are read 305, the data is adjusted for differences in the program window as indicated by the reference cell bit pattern differences that are stored in the conversion table 307. If the memory array of the memory device operates in the digital domain, the controller reads a digital signal corresponding to a four bit digital bit pattern for each memory cell read to determine the programmed states of the cells.

The method illustrated in FIG. 3 provides a sensing operation with the ability to adjust data read from memory cells with changes in the programming window as the memory device experiences increasing quantities of erase/program cycles. As shown in the level conversion table of FIG. 4, data read from a memory cell prior to any cycling is going to have a different reference fixed bit pattern associated with a given threshold level than data read after a number of cycling operations.

Figure 5:
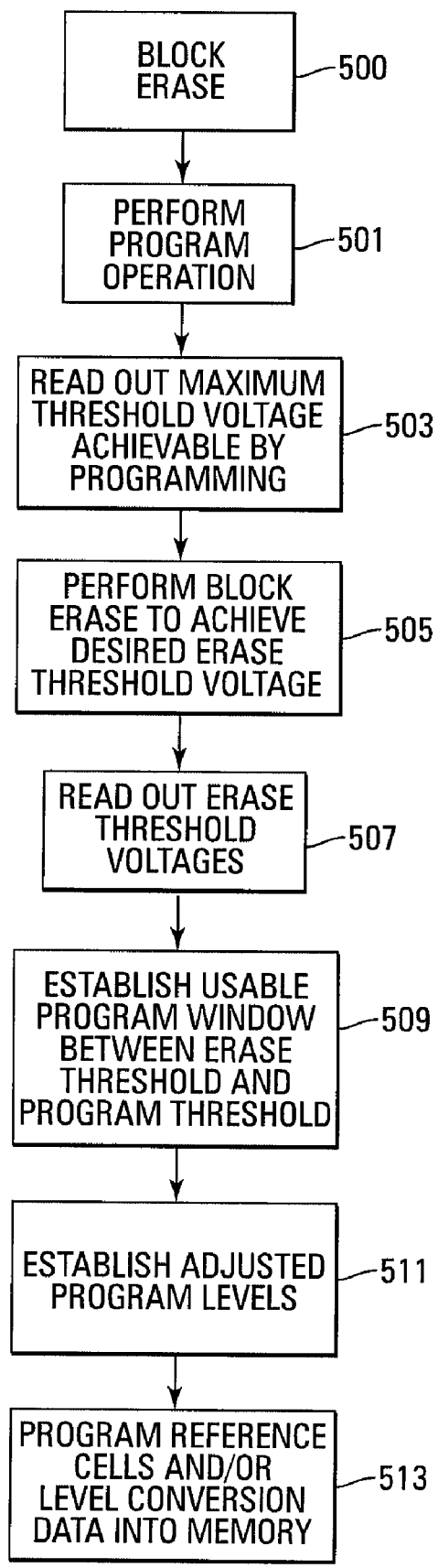
FIG. 5 shows a flowchart of an alternate embodiment of a program window adjustment method.

FIG. 5 illustrates a flowchart of an alternate embodiment of the program window adjustment method previously discussed. The embodiment of FIG. 2 adjusts the program window by tracking the erase levels. The alternate embodiment of FIG. 5 adjusts the program window by tracking both erase and programmed levels.

Since this method also tracks programmed levels, it begins by performing a block erase 500 followed by a program operation 501. The program operation is performed until the maximum programming level of the device is achieved. This maximum threshold voltage is then read out 503. A block erase operation is then performed 505 to achieve a maximum erase threshold voltage. The erase threshold voltages are then read out 507.

The maximum reliably programmable threshold voltage and the maximum reliably erasable threshold voltage are then used to generate a usable program window for the memory device 509. As in the previous embodiment, this window then defines the programmable range of the memory array such that all of the programmable levels should fit inside the window.

The margins between the programmable levels, as represented by bit patterns, are adjusted so as to maximize the use of the available program window 511. In other words, once the upper and lower boundaries are established by the minimum program threshold and the maximum erase threshold, the programmable states (as represented by bit patterns) are distributed throughout the window. The controller can also establish the number of program levels that would reliably fit in the window prior to actual programming of the block of memory cells. If a conversion table is used, it can be generated at this point as well and stored in memory 513. In an alternate embodiment, reference cells that are associated with the erased block are programmed with the adjusted program levels 513. In still another embodiment, both the conversion table is generated and the reference cells are programmed 513.

Data are read out of the memory cells are adjusted based on the adjusted program window. This is accomplished by generating a conversion table from the expected reference cell bit pattern and the actual bit pattern read from the reference cells. The conversion table can also be generated from reading the conversion information stored in memory in an alternate embodiment. The difference between the initial reference fixed bit pattern and the recently adjusted reference cell bit patterns is then determined. The conversion table is applied to the read data bit patterns from the memory cells to get the actual data.

The embodiment illustrated in FIG. 5 can be performed by the memory controller of the memory device. In one embodiment, it is performed prior to every program operation. Alternate embodiments perform the method after a certain number of erase/program cycles have been performed.

Figure 6:
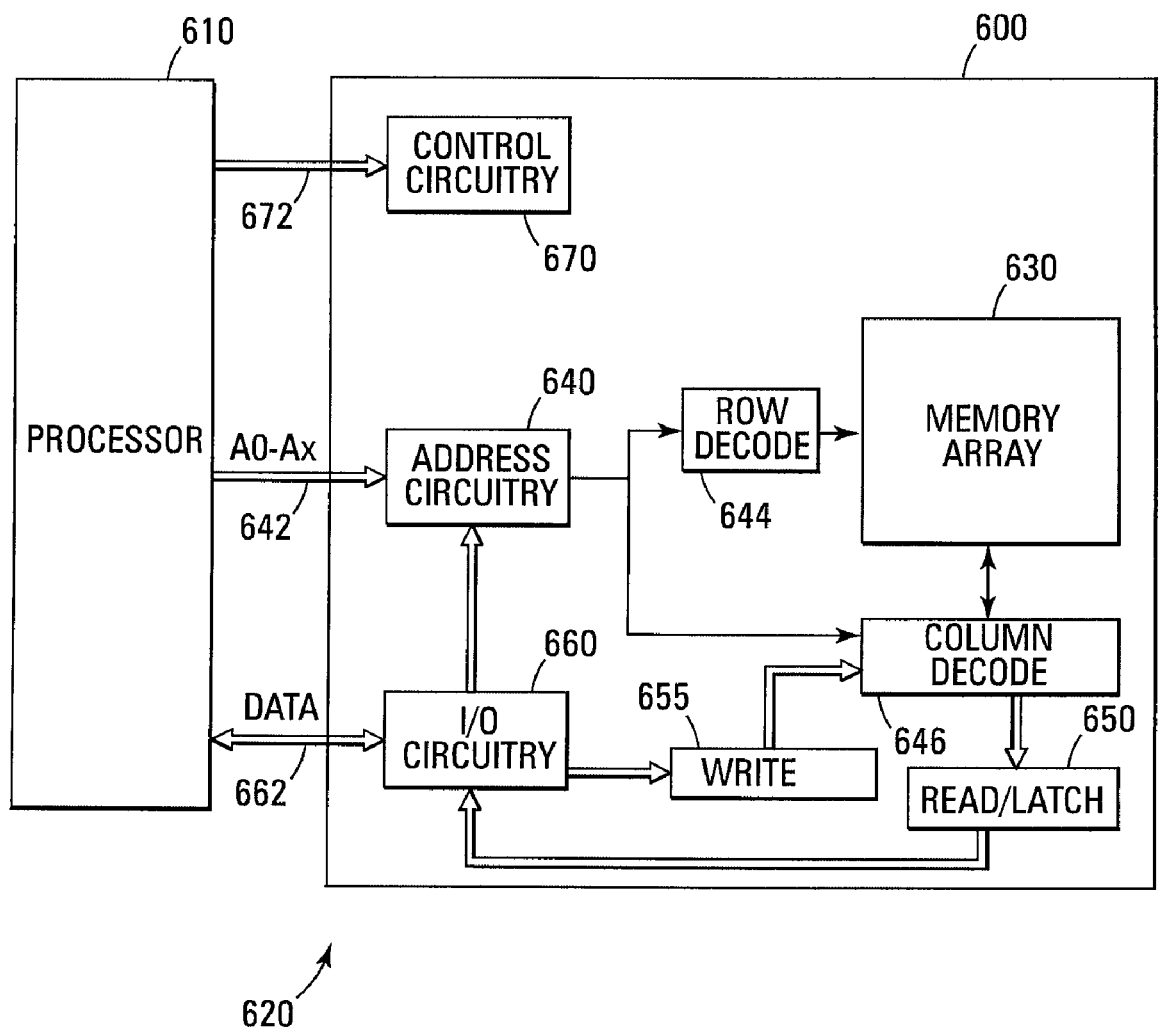
FIG. 6 shows a block diagram of one embodiment of a memory system incorporating the method for program window adjustment of the present disclosure.

FIG. 6 illustrates a functional block diagram of a memory device 600 that can incorporate the memory cells of the present invention. The memory device 600 is coupled to a processor 610. The processor 610 may be memory controller, a microprocessor or some other type of controlling circuitry. The memory device 600 and the processor 610 form part of a memory system 620. The memory device 600 has been simplified to focus on features of the memory that are helpful in understanding the present invention.

The memory device includes an array of non-volatile memory cells 630 that can be flash memory cells or other types of non-volatile semiconductor cells. The memory array 630 is arranged in banks of rows and columns. The control gates of each row of memory cells is coupled with a wordline while the drain and source connections of the memory cells are coupled to bitlines. As is well known in the art, the connection of the cells to the bitlines depends on whether the array is a NAND architecture or a NOR architecture. The memory cells of the present invention can be arranged in either a NAND or NOR architecture, as described previously, as well as other architectures.

An address buffer circuit 640 is provided to latch address signals provided on address input connections A0-Ax 642. Address signals are received and decoded by a row decoder 644 and a column decoder 646 to access the memory array 630. It will be appreciated by those skilled in the art, with the benefit of the present description, that the number of address input connections depends on the density and architecture of the memory array 630. That is, the number of addresses increases with both increased memory cell counts and increased bank and block counts.

The memory device 600 reads data in the memory array 630 by sensing voltage or current changes in the memory array columns using sense amplifier/buffer circuitry 650. The sense amplifier/buffer circuitry, in one embodiment, is coupled to read and latch a row of data from the memory array 630. Data input and output buffer circuitry 660 is included for bi-directional data communication over a plurality of data connections 662 with the controller 610. Write circuitry 655 is provided to write data to the memory array.

Control circuitry 670 decodes signals provided on control connections 672 from the processor 610. These signals are used to control the operations on the memory array 630, including data read, data write, and erase operations. The control circuitry 670 may be a state machine, a sequencer, or some other type of controller. The control circuitry 670 is adapted to perform the programming window adjustment embodiments disclosed previously. The control circuitry 670 can be part of the memory device 600 as shown or separate from the memory device 600.

The flash memory device illustrated in FIG. 6 has been simplified to facilitate a basic understanding of the features of the memory and is for purposes of illustration only. A more detailed understanding of internal circuitry and functions of flash memories are known to those skilled in the art. While the block diagram of FIG. 6 shows the control circuitry as being part of the memory device integrated circuit 600, alternate embodiments might have a memory array that is separate from the control circuit.

In one embodiment, all data manipulation, programming, and reading is performed in the digital domain without converting the digital data bit patterns to their equivalent voltage levels. An alternate embodiment performs these functions as voltages that are converted with analog-to-digital converters prior to manipulation by a separate controller. The controller then generates a digital signal corresponding to a bit pattern that is converted to a voltage level of an analog signal by a digital-to-analog converter for programming into the addressed memory cell or cells.

CONCLUSION

In summary, one or more embodiments of the present disclosure provide continual adjustment of the memory device programming window as the maximum reliable erase threshold voltage and maximum reliable program threshold voltage change due to erase/program cycling or other mechanisms. The present embodiments generate subsequent programming windows in response to program window changes.

The present embodiments optimize the program window over many blocks in a memory device. For example, one memory block may have a program window from −2V to +3V while another program block in the same memory device has a program window from −3.5V to +4V. The present embodiments make the initial program windows more uniform across the memory device due to differences in the memory blocks.

Not only can the embodiments of the present disclosure change the margins between levels in an adjusted program window but the quantity of levels can be adjusted as well. As the program window expands or contracts, the quantity of levels within that window can also be expanded or reduced as desired.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for programming window adjustment in a memory device, the method comprising:
   determining an initial programming window for a memory cell prior to an erase/program cycle, wherein the initial programming window encompasses all programming levels of a group of memory cells;
   determining a most positive reliable programmable threshold voltage and a most negative reliable erase threshold voltage for the group of memory cells; and
   adjusting the initial programming window in response to the most positive reliable programmable threshold voltage and the most negative reliable erase threshold voltage such that the programming levels move to remain in the programming window as the programming window is adjusted.

2. The method of claim 1 wherein determining the initial programming window comprises determining an initial erase threshold voltage level prior to the initial erase/program cycle.

3. The method of claim 1 wherein adjusting the programming window comprises increasing the most negative reliable erase threshold voltage.

4. The method of claim 1 and further including evaluating whether to adjust the programming window after every erase/program cycle.

5. The method of claim 1 and further including adjusting the programming window after a quantity of erase/program cycles.

6. A method for adjusting a programming window in a memory device, the method comprising:
   erasing a group of memory cells of the memory device;
   determining an initial erase threshold voltage of memory cells within the group of memory cells prior to performing an erase/program cycle;
   programming the group of memory cells to an initial program threshold voltage;
   generating an initial programming window in response to the initial erase threshold voltage and the initial program threshold voltage;
   determining subsequent erase and program threshold voltages of the group of memory cells after at least one erase/program cycle;
   generating a subsequent programming window in response to the subsequent erase threshold voltage; and
   programming the subsequent programming window to reference memory cells for the group of memory cells.

7. The method of claim 6 wherein the subsequent programming window is comprised of a plurality of threshold voltage levels that are each representative of a programmable state of a memory cell of the group of memory cells wherein each of the plurality of threshold voltages is represented by a converted bit pattern.

8. The method of claim 7 and further including changing the converted bit pattern representative of a particular threshold voltage of the plurality of threshold voltages in response to the subsequent erase threshold voltage.

9. The method of claim 6 and further including programming each reference memory cell in the group of memory cells with a reference fixed bit pattern that corresponds to a threshold voltage level within the subsequent programming window.

10. A method for adjusting a programming window in a memory device, the method comprising:
    performing a programming operation on a memory block of the memory device to a maximum reliable programmable threshold voltage;
    performing a block erase of the memory block to a maximum reliable erase threshold voltage;
    generating a programming window between the maximum reliable programmable threshold voltage and the maximum reliable erase threshold voltage wherein all programmable levels for the memory device are encompassed by the programming window; and
    moving the programmable levels to remain within the programming window when the programming window is adjusted.

11. The method of claim 10 and further comprising adjusting margins between each pair of adjacent programmable levels within the programming window.

12. The method of claim 11 and further including adjusting data bit patterns read out from the memory block in response to the plurality of programmable levels in the programming window.

13. A memory device comprising:
    a memory array comprising a plurality of memory cells; and
    a memory controller coupled to the memory array for controlling operation of the memory array wherein the memory controller is adapted to determine an initial erase threshold voltage for a memory cell prior to an erase/program cycle and adjust the initial erase threshold voltage to a subsequent erase threshold voltage in response to at least one erase/program cycle wherein the memory controller is further configured to generate a program window in response to the adjusted initial erase threshold voltage and an adjusted initial program voltage and determine a number of program levels that fit within the program window.

14. The memory device of claim 13 wherein the memory array is comprised of one of a NAND architecture or a NOR architecture.

15. The memory device of claim 13 wherein each of the plurality of memory cells is comprised of a plurality of programmable states each represented by a converted data bit pattern, each converted data bit pattern assigned to a reference fixed bit pattern wherein each reference fixed bit pattern is representative of a different programmable threshold voltage.

16. The memory device of claim 15 wherein the memory controller is further adapted to assign a different converted data bit pattern, to predetermined ones of the reference fixed bit patterns in response to the subsequent erase threshold voltage.

* * * * *